US011111985B1

(12) United States Patent
Francis et al.

(10) Patent No.: US 11,111,985 B1
(45) Date of Patent: Sep. 7, 2021

(54) VEHICLE DRIVELINE COMPONENT HAVING SPRING SETS DISPOSED BETWEEN A HOUSING AND A RING GEAR OF A TRANSMISSION TO MITIGATE NOISE GENERATED FROM TORQUE REVERSAL

(71) Applicant: BorgWarner Inc., Auburn Hills, MI (US)

(72) Inventors: Philip J. Francis, Lapeer, MI (US); Branden L. Reeves, Oxford, MI (US); Robert Keller, Chesterfield, MI (US); Stephen A. Mohan, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/842,858

(22) Filed: Apr. 8, 2020

(51) Int. Cl.
*F16H 1/28* (2006.01)
*F16H 57/00* (2012.01)
*F16H 37/08* (2006.01)

(52) U.S. Cl.
CPC ....... *F16H 1/2818* (2013.01); *F16H 37/0813* (2013.01); *F16H 57/0006* (2013.01)

(58) Field of Classification Search
CPC ...... F16H 1/2818; F16H 1/2863; F16H 57/12; F16H 2057/126; F16H 2057/127; F16H 57/0006; F16H 37/0813; F16D 2001/103
See application file for complete search history.

(56) References Cited

U.S. PATENT DOCUMENTS

| | | | |
|---|---|---|---|
| 1,864,256 A | 6/1931 | Nardone | |
| 2,500,393 A * | 3/1950 | Williams | F16D 3/00 475/347 |
| 2,868,037 A * | 1/1959 | Hindmarch | F16H 35/10 475/347 |
| 3,090,258 A | 5/1963 | Zinc et al. | |
| 3,364,768 A * | 1/1968 | Powell | F16H 57/023 74/339 |
| 3,583,825 A * | 6/1971 | Sadler | F16H 1/28 415/124.2 |
| 4,493,674 A | 1/1985 | Tamura et al. | |
| 4,503,719 A | 3/1985 | Hamano | |

(Continued)

FOREIGN PATENT DOCUMENTS

FR 2591696 A1 6/1987
GB 1008800 A 11/1965
(Continued)

*Primary Examiner* — Sherry L Estremsky
(74) *Attorney, Agent, or Firm* — Burris Law, PLLC (57) ABSTRACT

A vehicle driveline component with a housing, a ring gear of a transmission, and a plurality of spring sets. The housing defines a bore and a plurality of grooves that are spaced circumferentially about the bore. The ring gear includes an internally-toothed ring gear body and a plurality of mounting teeth that project radially from the ring gear body. The first mounting teeth are received into the grooves in the housing. Each of the spring sets has a first spring, which is disposed between a first side of an associated one of the mounting teeth and a first wall of an associated one of the grooves into which the associated one of the mounting teeth is received, and a second spring that is disposed between a second side of the associated one of the mounting teeth and a second wall of the associated one of the grooves.

23 Claims, 9 Drawing Sheets

(56) References Cited

U.S. PATENT DOCUMENTS

| | | | |
|---|---|---|---|
| 5,797,185 A | | 8/1998 | Sammataro et al. |
| 6,131,477 A | | 10/2000 | Gaydek et al. |
| 6,401,850 B1 | * | 6/2002 | Bowen .................... B60K 6/48 |
| | | | 180/65.6 |
| 7,281,442 B2 | | 10/2007 | Chane-Waye et al. |
| 7,455,121 B2 | * | 11/2008 | Saito ........................ B25B 21/02 |
| | | | 173/162.2 |
| 8,376,649 B2 | * | 2/2013 | Heinrich ................ F16D 21/06 |
| | | | 403/359.4 |
| 9,982,648 B2 | * | 5/2018 | Bauer ................... F02N 15/046 |
| 2010/0292043 A1 | | 11/2010 | Tao et al. |
| 2011/0094333 A1 | * | 4/2011 | Chane-Waye ........ F02N 15/046 |
| | | | 74/7 E |

FOREIGN PATENT DOCUMENTS

| | | | | | |
|---|---|---|---|---|---|
| JP | | 03140630 A | * | 6/1991 | ............. F16D 23/06 |
| JP | | 2005114068 A | * | 4/2005 | ............. F16C 29/123 |
| JP | | 2009168142 A | | 7/2009 | |
| JP | | 2009190423 A | * | 8/2009 | |

* cited by examiner

VEHICLE DRIVELINE COMPONENT HAVING SPRING SETS DISPOSED BETWEEN A HOUSING AND A RING GEAR OF A TRANSMISSION TO MITIGATE NOISE GENERATED FROM TORQUE REVERSAL

FIELD

The present disclosure relates to a vehicle driveline component having one or more spring sets that are disposed between a housing and a ring gear of a transmission to mitigate noise generated from a torque reversal.

BACKGROUND

This section provides background information related to the present disclosure which is not necessarily prior art.

It is relatively common to configure a vehicle driveline component, such as a transaxle, a power take-off unit, a transfer case or an electric drive unit, with a transmission having a ring gear that is intended to be non-rotatably mounted to a housing of the vehicle driveline component. In some vehicle driveline components, the ring gear has a plurality of external splines or teeth that are received into grooves formed in the housing. The external teeth on the ring gear are intended to be received into the grooves in the housing in a mating, slip-fit manner. In practice, there are manufacturing tolerances on both the circumferential width of the external teeth and the circumferential width of the grooves, and if both the external teeth and the grooves are formed within tolerance but to their minimum material conditions (i.e., so that the circumferential width of the external teeth is as small as is permitted and the circumferential width of the grooves is as large as is permitted), the amount of circumferential clearance can be significantly greater than a slip-fit, particularly if the grooves in the housing are net formed when the housing is formed (e.g., die cast).

During operation of the vehicle driveline component, the ring gear may be subjected to torque reversals, for example during a "tip-in" or "tip-out" event. To the extent that there is any circumferential clearance between the external teeth on the ring gear and the walls of the grooves in the housing, the ring gear can rotate by a limited amount in response to a torque reversal to drive the flanks or sides of the external teeth into contact with the walls of the grooves, which can create undesirable noise.

SUMMARY

This section provides a general summary of the disclosure, and is not a comprehensive disclosure of its full scope or all of its features.

In one form, the present disclosure provides a vehicle driveline component that includes a housing, a transmission and a plurality of spring sets. The housing defines a ring gear bore and a plurality of first grooves. The ring gear bore is disposed about an axis. The first grooves are disposed circumferentially about and intersect the ring gear bore. The transmission is received in the housing and has a ring gear. The ring gear includes a ring gear body and a plurality of first mounting teeth. The ring gear body defines an internally toothed aperture and is received in the ring gear bore. The first mounting teeth project radially from and are circumferentially spaced about the ring gear body. Each of the first mounting teeth is received into a corresponding one of the first grooves in the housing. Each of the spring sets has a first spring and a second spring. The first spring is disposed between a first side of an associated one of the first mounting teeth and a first wall of an associated one of the first grooves into which the associated one of the first mounting teeth is received, while the second spring is disposed between a second side of the associated one of the first mounting teeth and a second wall of the associated one of the first grooves.

In another form, the present disclosure provides a vehicle driveline component that includes a housing, a transmission and a spring set. The housing defines a ring gear bore, a first groove, and a plurality of second grooves. The ring gear bore is disposed about an axis. The first groove intersects the ring gear bore. The second grooves are disposed circumferentially about and intersect the ring gear bore. The transmission is received in the housing and includes a ring gear. The ring gear has a ring gear body, a first mounting tooth, and a plurality of second mounting teeth. The ring gear body defines an internally toothed aperture and is received in the ring gear bore. The first mounting tooth projects radially from and is received into the first groove in the housing. Each of the second mounting teeth project radially from and are circumferentially spaced about the ring gear body. Each of the second mounting teeth is received into a corresponding one of the second grooves in the housing such that a first flank of each of the second mounting teeth abuts a first wall of an associated one of the second grooves and a second flank of each of the second mounting teeth abuts a second wall of the associated one of the second grooves. The spring set has a first spring and a second spring. The first spring is disposed between a first side of the first mounting tooth and a first wall of the first groove, while the second spring is disposed between a second side of the first mounting tooth and a second wall of the first groove.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
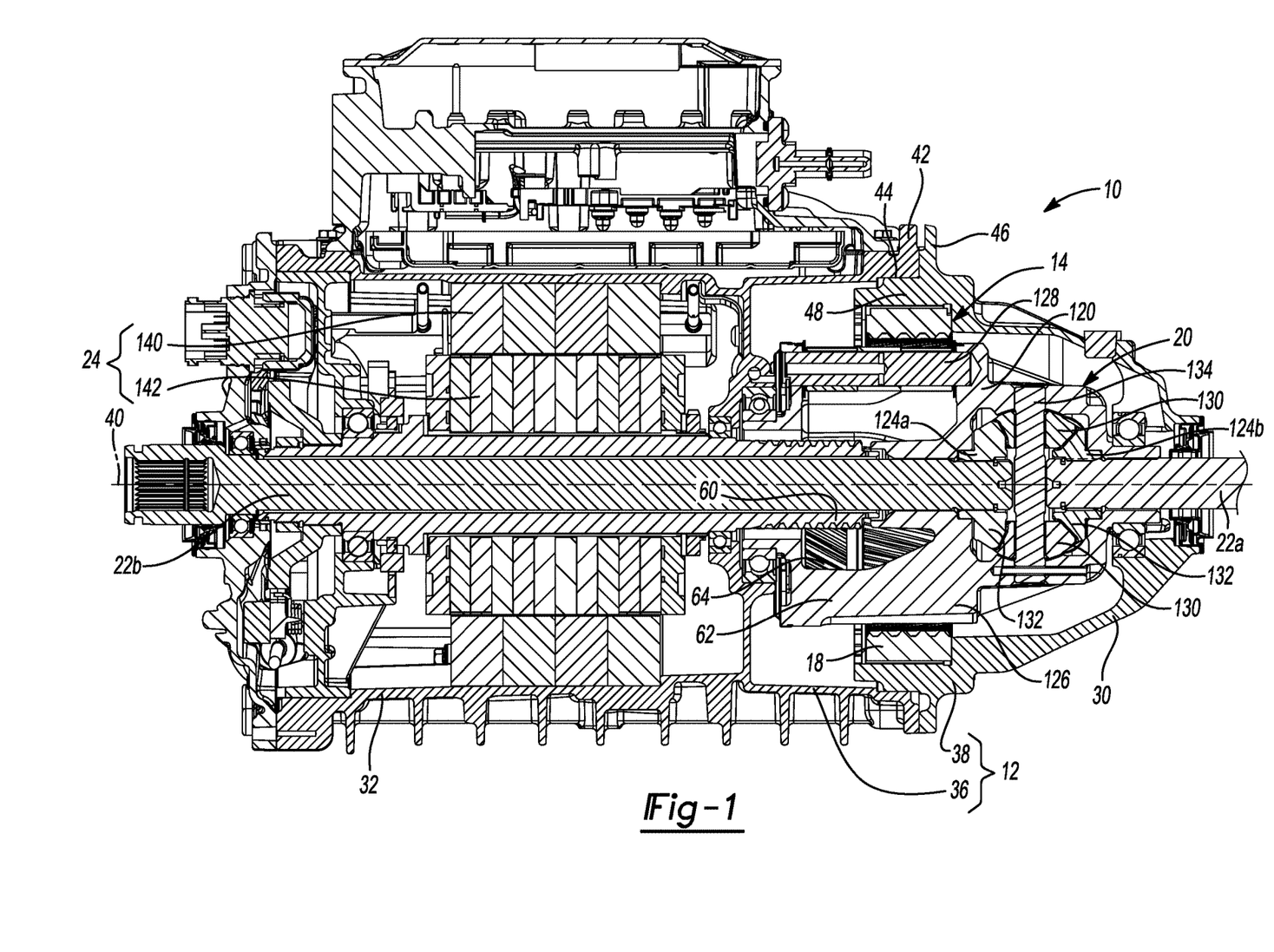
FIG. 1 is a lateral cross-sectional view of an exemplary vehicle driveline component constructed in accordance with the teachings of the present disclosure.
Figure 2:
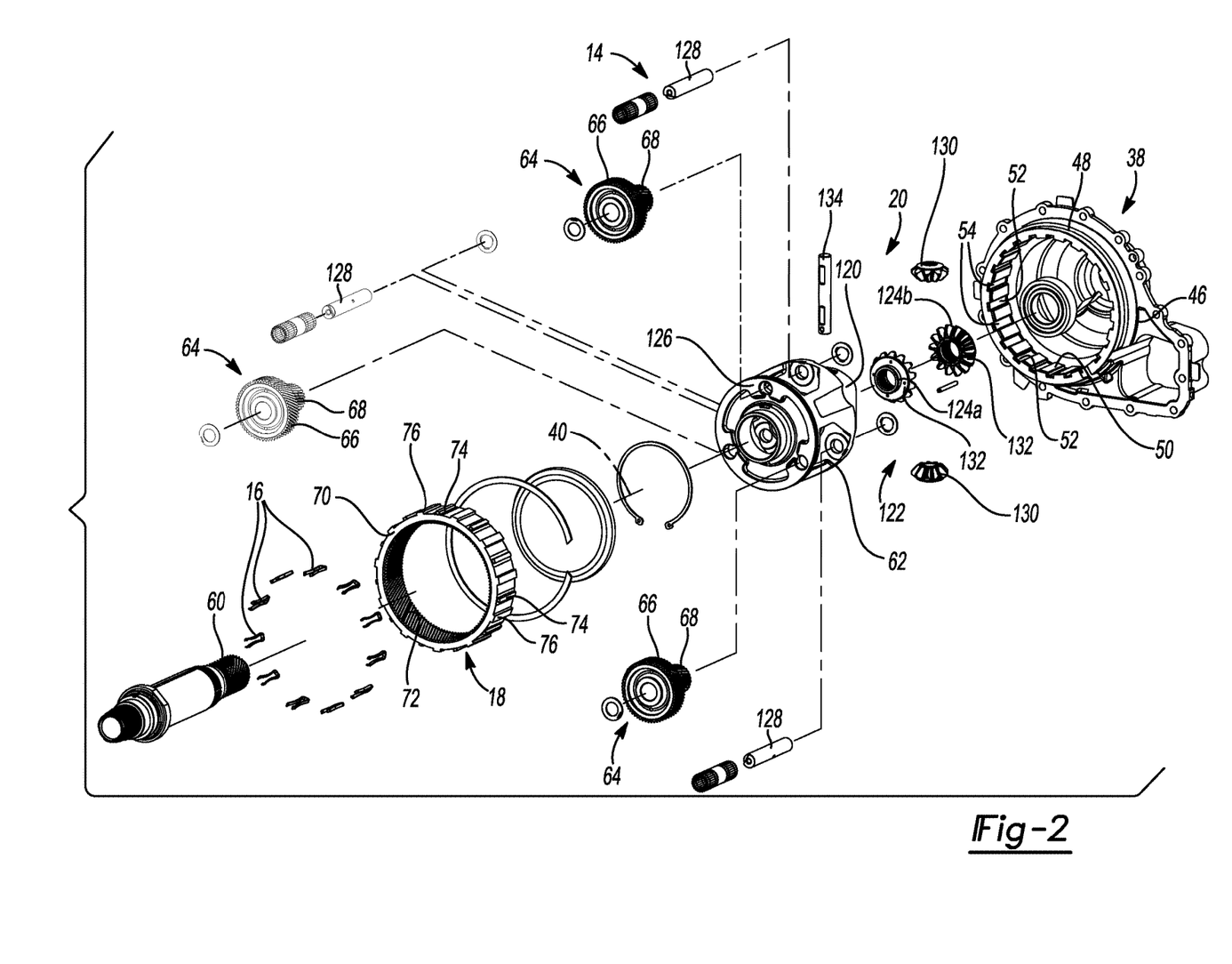
FIG. 2 is an exploded perspective view of a portion of the vehicle driveline component of FIG. 1, the view illustrating a portion of a housing, a transmission and a plurality of spring sets in more detail.

With reference to FIGS. 1 and 2, an exemplary vehicle driveline component constructed in accordance with the teachings of the present disclosure is generally indicated by reference numeral 10. The vehicle driveline component 10 includes a housing 12, a transmission 14 and one or more spring sets 16. The transmission 14 includes a gear element, such as a ring gear 18, that is mounted to the housing 12 in a way that inhibits or limits relative rotation between the gear element and the housing. The spring set(s) 16 is/are configured to provide a modicum of rotational compliance between the gear element and the housing 12 under certain circumstances.

In the example provided, the vehicle driveline component 10 is an electric drive unit that also includes a differential assembly 20, a pair of output shafts 22a and 22b, respectively, and an electric motor 24. It will be appreciated, however, that the present disclosure is broadly applicable to other vehicle driveline components, such as axle assemblies, transfer cases, power take-off units, that include a transmission with a gear element that is mounted to a housing, as well as generally to any sort of gear reduction that is housed in a housing and which has a gear element that is mounted to the housing and where it is desirable to provide a modicum of rotational compliance between the gear element and the housing under certain circumstances.

The housing 12 can have a gearbox portion 30, which is configured to house the transmission 14, and a one or more other portions, such as a motor housing portion 32, which can be configured to house the electric motor 24 as well as to isolate the gearbox portion 30 from the electric motor 24. The housing 12 can include a first housing component 36 and a second housing component 38 that can cooperate to form the gearbox portion 30 that is disposed along a rotational axis 40.

Figure 3:
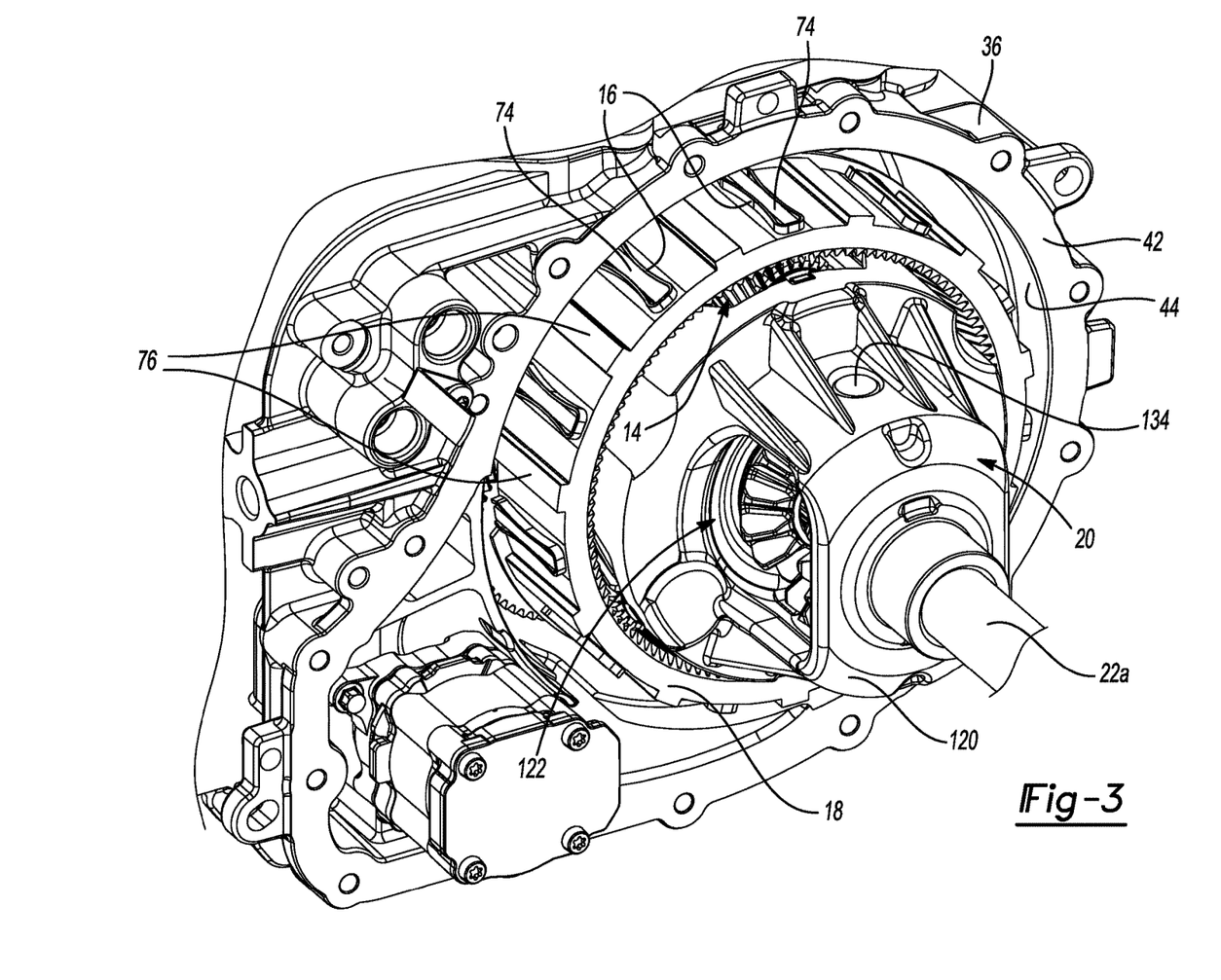
FIG. 3 is a perspective view of a portion of the vehicle driveline component of FIG. 1 with the portion of the housing shown in FIG. 2 removed.

With reference to FIGS. 1 through 3, the first housing component 36 can have a first mounting flange 42 and can define a housing bore 44. The second housing component 38 can have a second mounting flange 46 and an annular connection member 48 that projects axially outwardly away from the second mounting flange 46. In the particular example provided, the first housing component 36 defines an open end of the gearbox portion 30 and the second housing component 38 is mated to the first housing component 36 to complete and substantially close off the gearbox portion 30.

The second housing component 38 defines a ring gear bore 50, one or more first grooves 52, and optionally includes one or more second grooves 54. The annular connection member 48 is sized to be received into the housing bore 44 such that receipt of the annular connection member 48 into the housing bore 44 aligns an axis of the ring gear bore 50 to the rotational axis 40 in a coincident manner. Each of the first grooves 52 can intersect and extend radially from the ring gear bore 50, and can extend axially through the entirety of the annular connection member 48. In the example provided, a plurality of first grooves 52 are formed in the second housing component 38 and the first grooves 52 are spaced circumferentially about the ring gear bore 50. Each of the second grooves 54, if provided, can intersect and extend radially from the ring gear bore 50, and can extend axially through the entirety of the annular connection member 48. In the example provided, a plurality of second grooves 54 are formed in the second housing component 38 and the second grooves 54 are spaced circumferentially about the ring gear bore 50 such that one of the second grooves 54 is disposed circumferentially between a pair of the first grooves 52. In the example provided, the first and second grooves 52 and 54 have a common circumferential width, but it will be appreciated that a portion of the first grooves 52 can be sized differently from another portion of the first grooves 52, and/or that a portion of the second grooves 54 can be sized differently from another portion of the second grooves 54, and/or that the first grooves 52 can be sized differently from the second grooves 54.

With reference to FIGS. 1 and 2, the transmission 14 can include a planetary transmission having the ring gear 18, a sun gear 60, a planet carrier 62 and a plurality of planetary gears 64.

Figure 4:
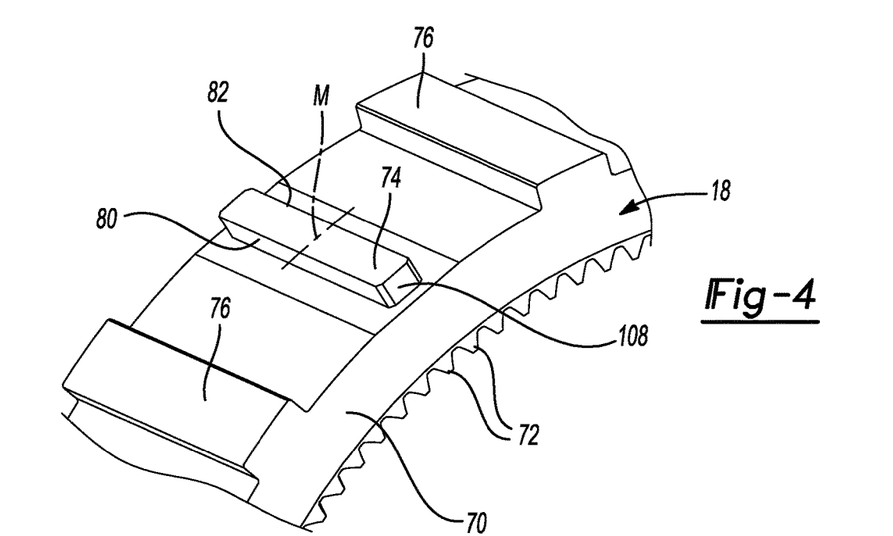
FIG. 4 is a perspective view of a portion of the transmission that is shown in FIG. 2, the view depicting the construction of a ring gear.

With reference to FIGS. 2 and 4, the ring gear 18 can have an annular ring gear body 70, a plurality of ring gear teeth 72 formed on the inside diameter of the ring gear body 70, one or more first mounting teeth 74 and optionally one or more second mounting teeth 76. The ring gear body 70 is sized to be received in the ring gear bore 50 in the second housing component 38. Each of the first mounting teeth 74 project radially from the ring gear body 70. If the ring gear 18 includes a plurality of the first mounting teeth 74, the first mounting teeth 74 are circumferentially spaced about the ring gear body 70. Each of the second mounting teeth 76, if included, project radially from the ring gear body 70. If the ring gear 18 includes a plurality of the second mounting teeth 76, the second mounting teeth 76 are circumferentially spaced about the ring gear body 70.

Optionally, each of the second mounting teeth 76 can be disposed circumferentially between a pair of the first mounting teeth 74 and/or each of the first mounting teeth 74 can be disposed circumferentially between a pair of the second mounting teeth 76. In the example provided, the ring gear 18 comprises equal quantities of the first and second mounting teeth 74 and 76 and as such, the first and second mounting teeth 74 and 76 are staggered about the circumference of the ring gear body 70.

With reference to FIGS. 1, 2, 4 and 9, when the ring gear 18 is inserted into the ring gear bore 50 in the second housing component 38, the first mounting teeth 74 are received into the first grooves 52 and the second mounting teeth 76 are received into the second grooves 54. Each of the first mounting teeth 74 is sized relative to the first grooves 52 such that first and second sides 80 and 82, respectively, of each of the first mounting teeth 74 is spaced circumferentially apart from first and second walls 84 and 86, respectively of an associated one of the first grooves 52. Each of the second mounting teeth 76 is sized relative to the second grooves 54 such that first and second sides 90 and 92, respectively, of each the second mounting teeth 76 abuts first and second walls 94 and 96, respectively, of an associated one of the second grooves 54. It will be appreciated that there is either a small amount of circumferential clearance or line-to-line contact between the first sides 90 of the second mounting teeth 76 and the first walls 94 of the second grooves 54 or a relatively small amount of, and a relatively small amount of circumferential clearance or line-to-line contact between the second sides 92 of the second mounting teeth 76 and the second walls 96 of the second grooves 54, which permits the ring gear 18 to be fully inserted to the second housing component 38.

Figures 5, 6:
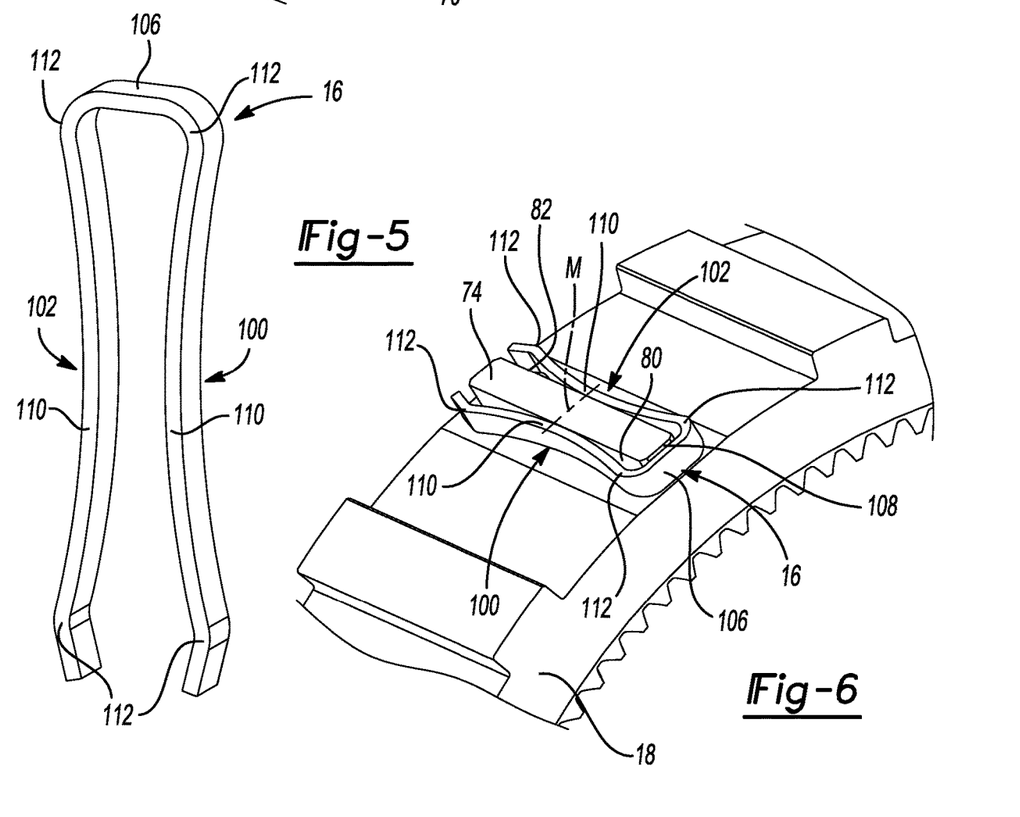
FIG. 5 is a perspective view of one of the spring sets that is shown in FIG. 2.
FIG. 6 is a perspective view of the portion of the ring gear shown in FIG. 4 with the spring set shown in FIG. 5 mounted thereto.
Figure 9:
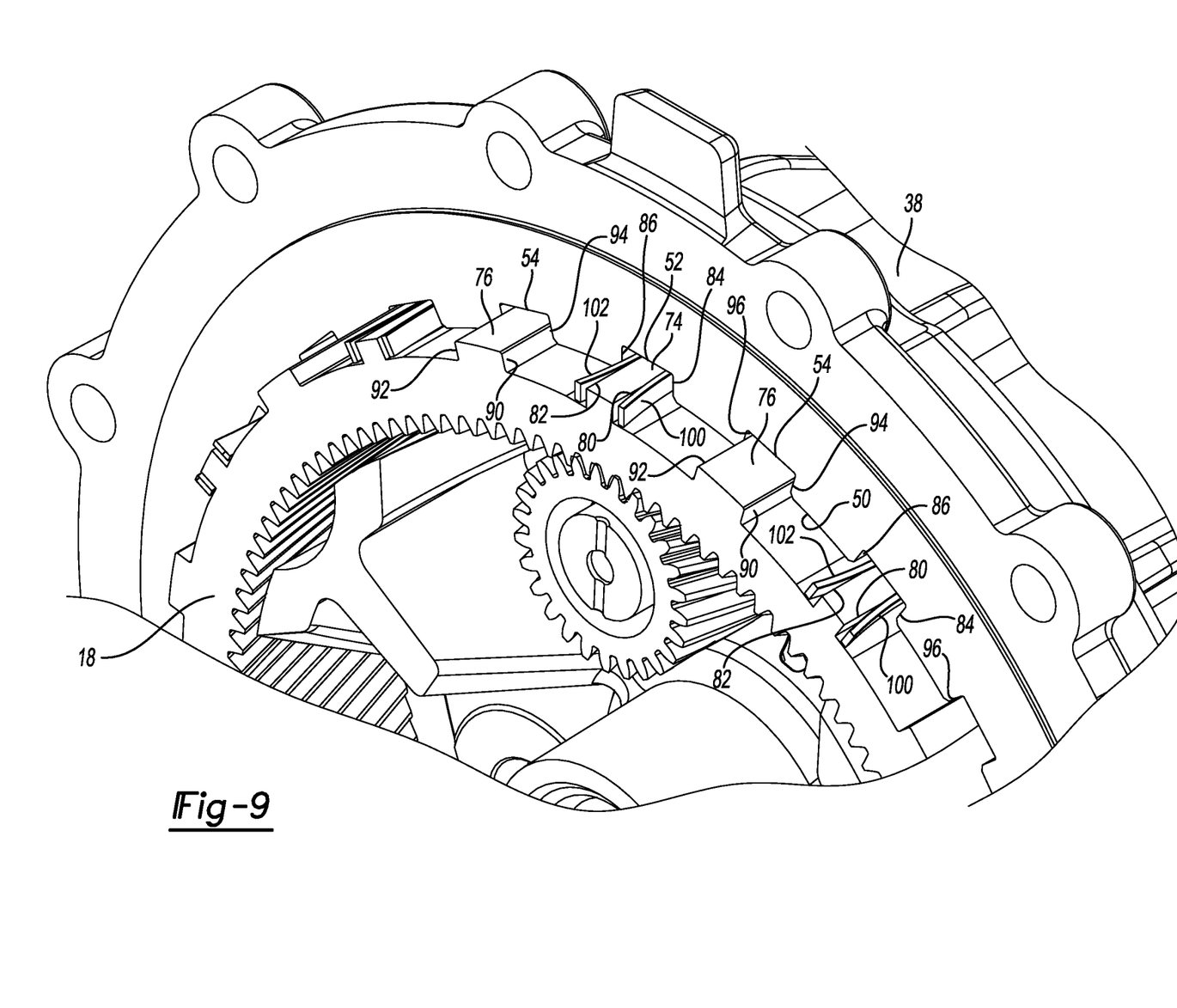
FIG. 9 is a perspective view of a portion of the vehicle driveline component of FIG. 1 showing the ring gear and the spring sets mounted in a portion of the housing.
Figure 10:
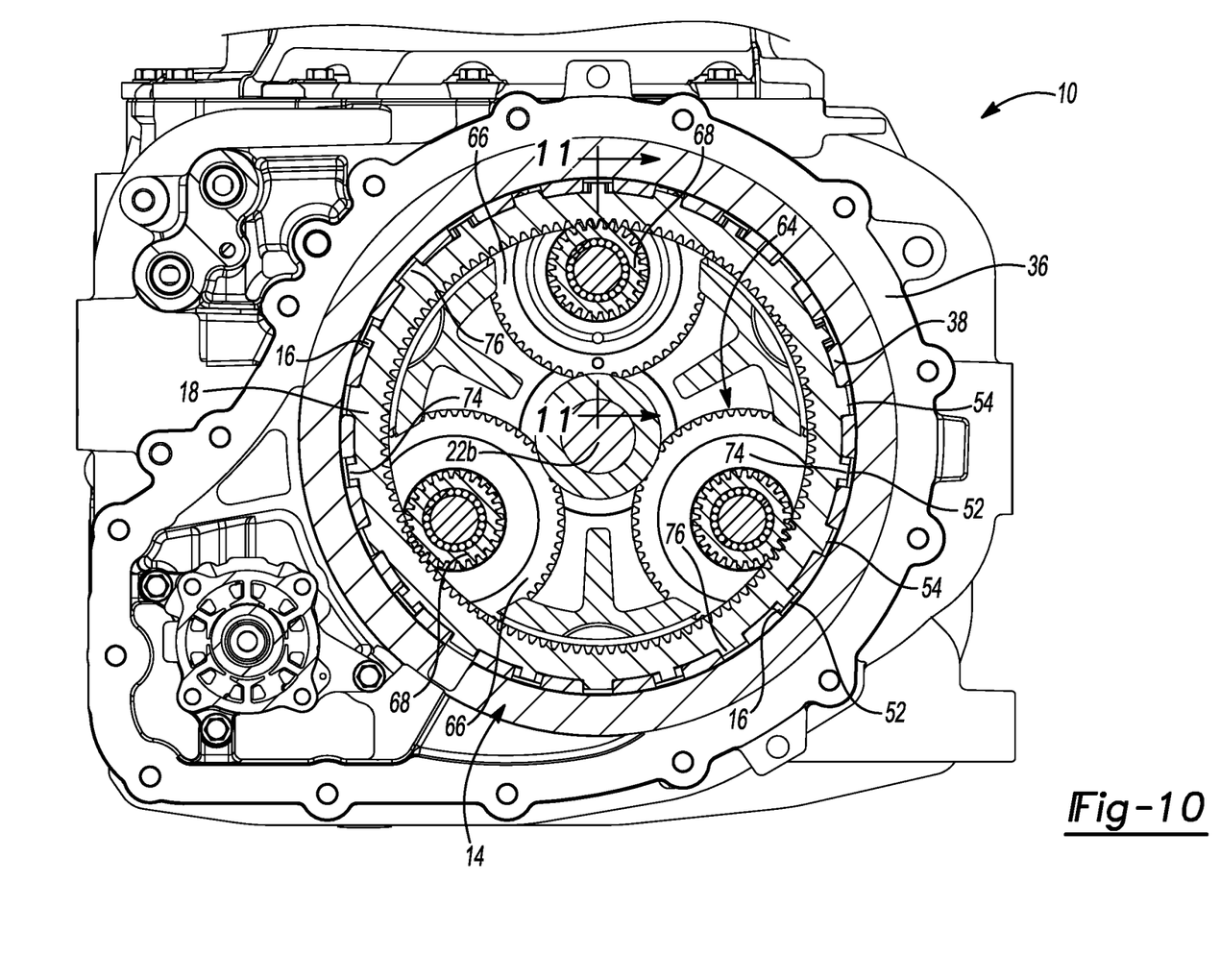
FIG. 10 is a side elevation view in partial section of a portion of the vehicle driveline component of FIG. 1 showing the ring gear and spring sets mounted in a portion of the housing.
Figure 11:
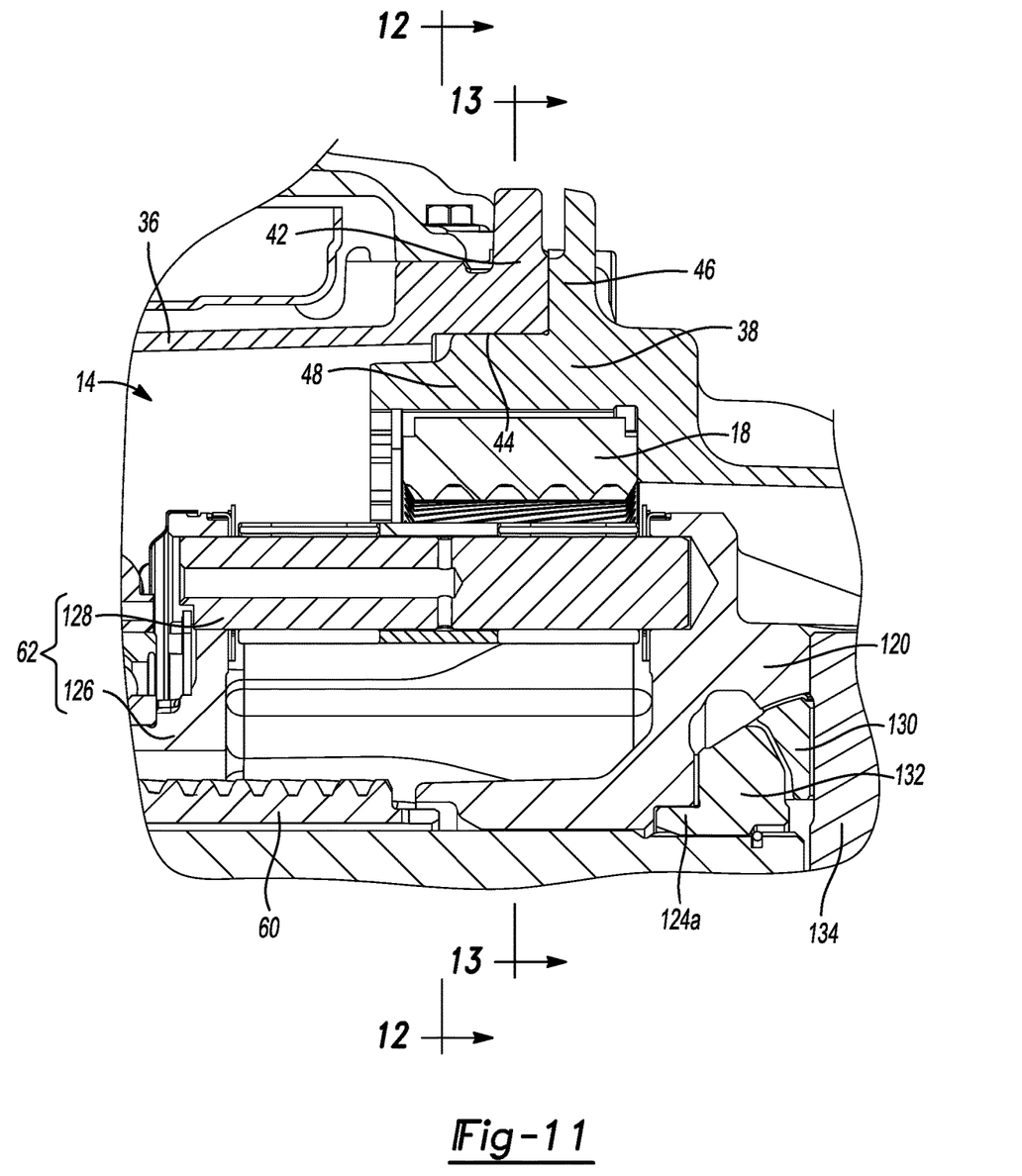
FIG. 11 is a sectional view taken along the line 11-11 of FIG. 10.
Figure 12:
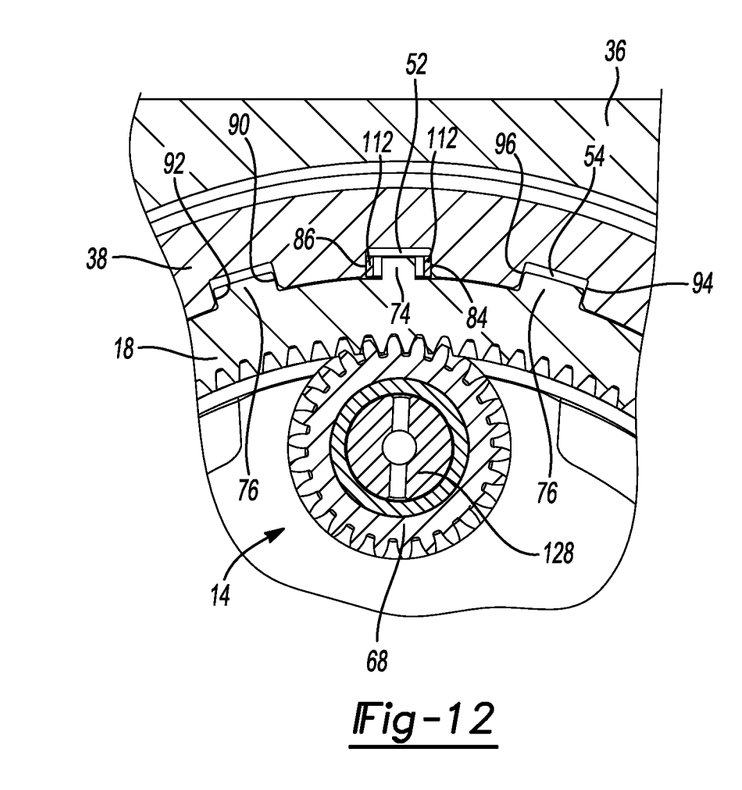
FIG. 12 is a sectional view taken along the line 12-12 of FIG. 11.
Figure 13:
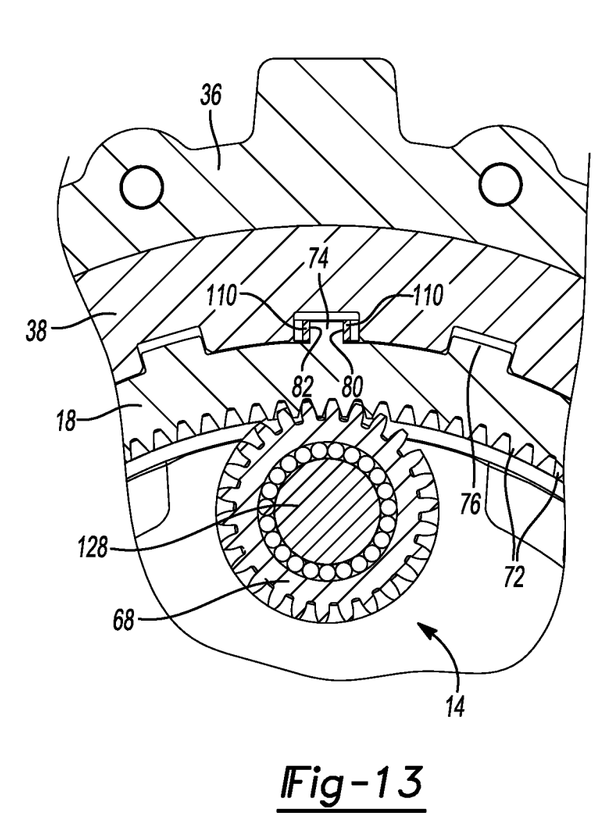
FIG. 13 is a sectional view taken along the line 13-13 of FIG. 11.

With reference to FIGS. 5, 6 and 9, each spring set 16 can have a first spring 100, which is received between the first side 80 of a corresponding one of the first mounting teeth 74 and a first wall 84 of a corresponding one of the first grooves 52, and a second spring 102 that is received between the second side 82 of the corresponding one of the first mounting teeth 74 and the second wall 86 of the corresponding one of the first grooves 52. The first and second springs 100 and 102 exert forces to the second housing component 38 and the ring gear 18 that tend to center the first mounting teeth 74 within the first grooves 52.

The first and second springs 100 and 102 can be any type of springs, such as coil compression spring, but are depicted as types of leaf springs in the example provided. The first and second springs 100 and 102 of each spring set 16 can be fixedly coupled to one another and can optionally be mounted to a corresponding one of the first mounting teeth 74. In the particular example provided, for example, each spring set 16 comprises a joining section 106 that spans across an axial end surface 108 of the corresponding one of the first mounting teeth 74 and has a first end, which is fixedly coupled to the first spring 100, and a second end that is opposite the first end and fixedly coupled to the second spring 102. The configuration of the spring set 16 is similar to that of a clip and permits the several spring sets 16 to be mounted to their corresponding first mounting teeth 74 prior to the installation of the ring gear 18 to the second housing component 38.

In the example provided, the first and second springs 100 and 102 can be configured in an identical manner and as such, only a discussion of the first spring 100 need be provided herein. It will be appreciated, however, that the first and second springs 100 and 102 could be configured differently. The first spring 100 can have a first arcuate segment 110, which is configured to contact the first side 80 of the corresponding one of the first mounting teeth 74, and at least one second arcuate segment 112 that is configured to contact the first wall 84 of the corresponding one of the first grooves 52. In the example shown, the first spring 100 comprises a pair of the second arcuate segments 112, and the first arcuate segment 110 is disposed along a length of the first spring 100 between the pair of second arcuate segments 112. In this example, the first arcuate segment 110 is configured to contact the first side 80 of the corresponding one of the first mounting teeth 74 at a location along a length of the first side 80 that is within 20% of a midpoint M of the length of the first side 80. The location of contact between the first arcuate segment 110 and the first side 80 preferably occurs within 10% of the midpoint M of the length of the first side 80, and more preferably occurs within 5% of the midpoint M of the length of the first side 80. Each of the second arcuate segments 112 can contact the first wall 84 of the corresponding one of the first grooves 52 at a desired location, such as at points that are symmetrically disposed about the location of contact between the first arcuate segment 110 and the first side 80. For example, a first one of the second arcuate segments 112 can contact the first wall 84 at a location on the first wall 84 that is within 25% of a length of the first side 80 of the associated one of the first mounting teeth 74 from an associated axial end surface 108 of the associated one of the first mounting teeth 74.

Figure 7:
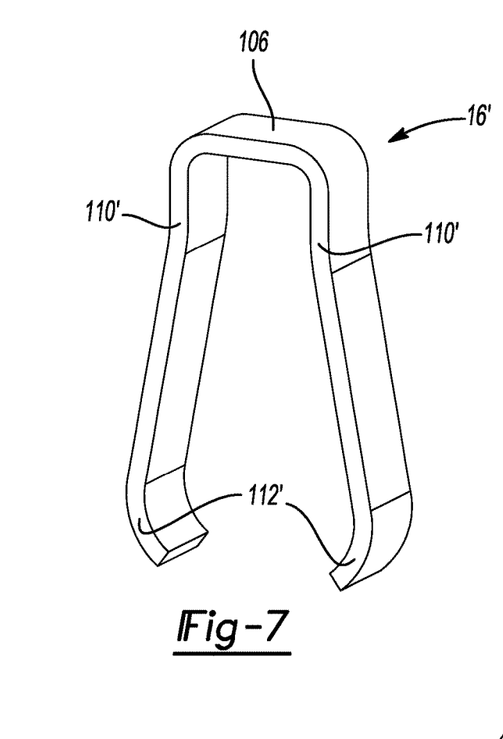
FIG. 7 is a perspective view of an alternately configured spring set.
Figure 8:
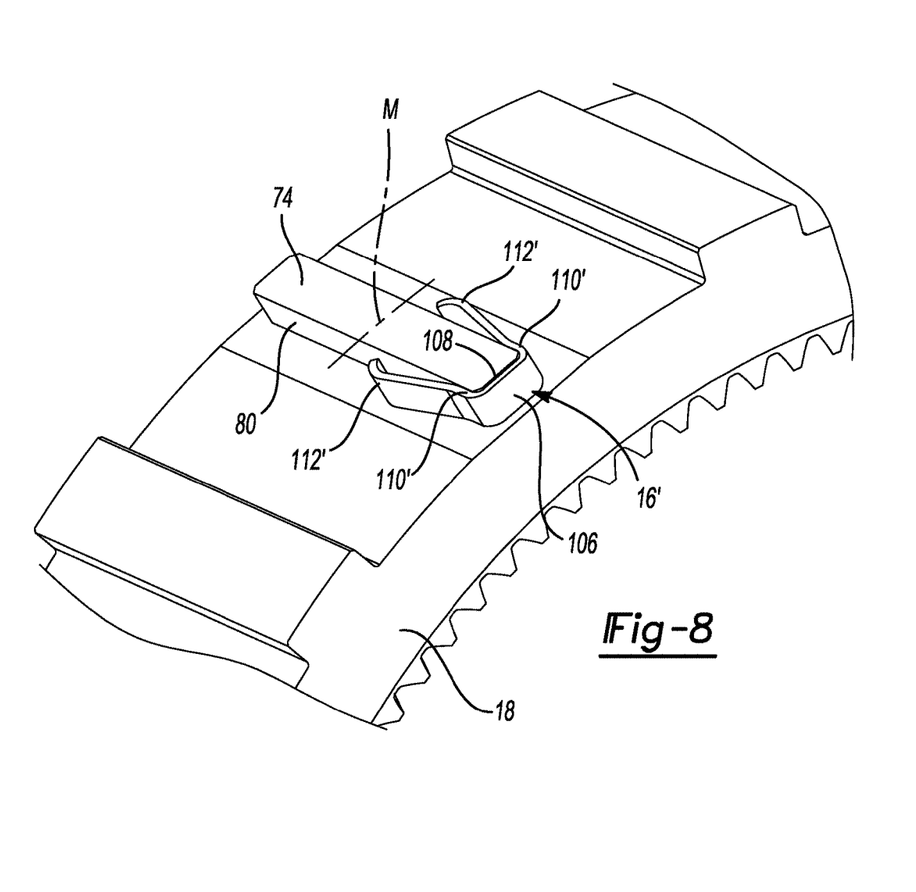
FIG. 8 is a perspective view of the portion of the ring gear shown in FIG. 4 with the spring set shown in FIG. 7 mounted thereto.

A second exemplary configuration of the spring set is depicted in FIGS. 7 and 8. In this example, the first arcuate segment 110' is disposed adjacent to the joining section 106 and the spring set 16' includes a single one of the second arcuate segments 112'. The spring set 16' is relatively shorter in overall length than the spring set 16 of FIGS. 6 & 7, spanning to or somewhat prior to the midpoint M of the associated one of the first mounting teeth 74. In this example, the first arcuate segment 110' contacts the first side 80 at a location on the first side 80 that is within 25% of the length of the first side 80 of the associated one of the first mounting teeth 74 from an associated axial end surface 108 of the associated one of the first mounting teeth 74, while the second arcuate segment 112' contacts the first wall 84 (FIG. 9) at a location on the first wall 84 (FIG. 9) that is within 20% of the length of the first side 80 from a midpoint of a length of the first wall 84.

With reference to FIGS. 10 through 13, it will be appreciated that the ring gear 18 is intended to remain in a rotationally stationary condition relative to the second housing component 38 during operation of the transmission 14, and that the fit between the second mounting teeth 76 and second grooves 54, if included, would be intended as primary means for inhibiting or limiting relative rotation between the ring gear 18 and the second housing component 38. However, due to the relatively small amount of circumferential clearance between the second mounting teeth 76 and the first and second walls 94 and 96 of the second grooves 54, which is needed for installation of the ring gear 18 to the second housing component 38, a limited amount of rotational movement of the ring gear 18 relative to the second housing component 38 can be produced when the ring gear 18 is subjected to a torque reversal. This condition may be exacerbated by manufacturing tolerance (e.g., a minimum material condition of the second mounting teeth 76 and a minimum material condition of the second grooves 54 when the ring gear 18 is newly installed to the second housing component 38. The application of a torque reversal to the ring gear 18 causes the first sides 90 of the second mounting teeth 76 to impact against the first walls 94 of the second grooves 54 or the second sides 92 of the second mounting teeth 76 to impact against the second walls 96 of the second grooves 54, depending upon the direction of the torque reversal. In some situations, the circumferential clearance between the second mounting teeth 76 and the second grooves 54 could become sufficiently large so that the impacting of the second mounting teeth 76 against the second housing component 38 during a torque reversal may become audible. The spring sets 16, however, provide rotational resistance that slows the rotational movement of the ring gear 18 relative to the second housing component 38 during a torque reversal, which helps to attenuate any noise that would otherwise be generated by a torque reversal.

The spring sets 16 can be configured to permit rotation between the ring gear 18 and the second housing component 38 by an amount that is sufficient to permit contact between the first sides 90 of the second mounting teeth 76 and the first walls 94 of the second grooves 54 or between the second sides 92 of the second mounting teeth 76 and the second walls 96 of the second grooves 54 when a predetermined torsional load is applied to the ring gear 18. For example, the predetermined torsional load can be less than or equal to a desired portion of a maximum torsional load that the ring gear 18 is expected to carry during the operation of the vehicle driveline component 10. In the example provided, the desired portion of the predetermined torsional load is three percent of the maximum torsional load of the ring gear 18, but it will be appreciated that a larger or smaller portion of the predetermined torsional load could be employed. It will be appreciated that the first and second springs 100 and 102 of each spring set 16 can be compressed somewhat when the spring sets 16 are installed between the ring gear 19 and the second housing component 38 (i.e., when each first spring 100 is installed between the first side 80 of the corresponding one of the first mounting teeth 74 and the first wall 84 of a corresponding one of the first grooves 52, and each second spring 102 is installed between the second side 82 of the corresponding one of the first mounting teeth 74 and the second wall 86 of the corresponding one of the first grooves 52).

With reference to FIGS. 1 and 2, the transmission 14 in the example provided further includes a sun gear 60, a planet carrier 62 and a plurality of planetary gears 64. The sun gear 60 is disposed concentrically about the rotational axis 40. The planet carrier 62 journally supports the planetary gears 64 for rotation about respective planet axes that are disposed concentrically about the rotational axis 40. Each of the planetary gears 64 is meshingly engaged with the sun gear 60 and the ring gear 18. In the example provided, each of the planetary gears 64 is a compound planetary gear, having a first planet gear 66, which is meshingly engaged to the sun gear 60, and a second planet gear 68 that is coupled to the first planet gear 66 for rotation therewith and meshingly engaged to the ring gear 18.

The differential assembly 20 can include a differential input member 120, and a differential gearset 122 with a pair of differential output members 124a, 124b. The differential input member 120 can be coupled to the planet carrier 62 of the transmission 14 for common rotation about the rotational axis 40. In the particular example provided, the planet carrier 62 has a carrier body 126 and a plurality of axles or pins 128, which are mounted to the carrier body 126 and on which the planetary gears 64 are rotatably mounted, and the differential input member 120 is a differential case that is unitarily and integrally formed with the carrier body 126. The differential gearset 122 is configured to receive rotary power from the differential input member 120 and to transmit rotary power via the differential output members 124a, 124b to the output shafts 22a and 22b, respectively. In this regard, each of the output shafts 22a and 22b is coupled for rotation with a corresponding one of the differential output members 124a, 124b. In the example shown, the differential gearset 122 includes a plurality of differential pinions 130 and a pair of side gears 132. The differential pinions 130 are coupled to the differential input member 120 for rotation therewith about the rotational axis 40, but are each rotatable relative to the differential input member 120 about a respective differential pinion axis. The differential pinions 130 could include a journal segment (not shown) that is rotatably received in the differential input member 120, but in the example provided, the differential pinions 130 are mounted on a conventional cross-pin 134 that is mounted to the differential input member 120 and which extends through the differential input member 120 in a manner that is perpendicular to the rotational axis 40. Each of the side gears 132 is meshingly engaged with the differential pinions 130 and either is or drives an associated one of differential output members 124a, 124b. As shown, each side gear 132 is integrally and unitarily formed with a respective one of the differential output members 124a, 124b, but it will be appreciated that the differential output members 124a, 124b could be discrete components that could be assembled to or connected to (e.g., via a clutch or coupling) to a respective one of the side gears 132.

In FIG. 1, the electric motor 24 can include a stator 140, which can be housed in the motor housing portion 32 of the housing 12, and a rotor 142 that can be disposed in the stator 140 for rotation about the rotational axis 40. The sun gear 60 can be coupled to the rotor 142 for rotation therewith. The rotor 142 and the sun gear 60 can be hollow structures and one of the output shafts 22a and 22b can be coaxially received therethrough.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a housing defining a ring gear bore and a plurality of first grooves, the ring gear bore being disposed about an axis, the first grooves being disposed circumferentially about and intersecting the ring gear bore;
a transmission received in the housing, the transmission having a ring gear with a ring gear body and a plurality of first mounting teeth, the ring gear body defining an internally toothed aperture, the ring gear body being received in the ring gear bore, the first mounting teeth projecting radially from and being circumferentially spaced about the ring gear body, each of the first mounting teeth being received into a corresponding one of the first grooves in the housing; and
a plurality of spring sets, each of the spring sets having a first spring and a second spring, the first spring being disposed between a first side of an associated one of the first mounting teeth and a first wall of an associated one of the first grooves into which the associated one of the first mounting teeth is received, the second spring being disposed between a second side of the associated one of the first mounting teeth and a second wall of the associated one of the first grooves;
wherein the housing defines at least one second groove that intersects the ring gear bore, wherein the ring gear has at least one second mounting tooth that projects radially from the ring gear body, each of the at least one second mounting tooth being received into a corresponding one of the at least one second groove in the housing such that a first side of the at least one second mounting tooth abuts a third wall of the corresponding one of the second groove and a second side of the at least one second mounting tooth abuts a fourth wall of the corresponding one of the second groove.

2. The vehicle driveline component of claim 1, wherein the first and second springs of each of the spring sets are fixedly coupled to one another.

3. The vehicle driveline component of claim 2, wherein each spring set is mounted on a corresponding one of the first mounting teeth.

4. The vehicle driveline component of claim 3, wherein each spring set comprises a joining section, wherein each of the first and second springs is a leaf spring, wherein the joining section spans across an axial end of the corresponding one of the first mounting teeth, wherein a first end of the joining section is fixedly coupled to the first spring, and wherein a second end of the joining section that is opposite the first end is fixedly coupled to the second spring.

5. The vehicle driveline component of claim 4, wherein the first spring has a first arcuate segment, which contacts the first side of the associated one of the first mounting teeth, and at least one second arcuate segment that contacts the first wall of the associated one of the first grooves.

6. The vehicle driveline component of claim 5, wherein the first spring includes a single second arcuate segment and wherein the first arcuate segment is disposed between the joining section and the single second arcuate segment.

7. The vehicle driveline component of claim 6, wherein the second arcuate segment contacts the first wall of the associated one of the first grooves at a location along a length of the first wall that is within 20% of a midpoint of the length of the first wall.

8. The vehicle driveline component of claim 5, wherein the first spring includes a pair of the second arcuate segments and wherein the first arcuate segment is disposed between the pair of the second arcuate segments.

9. The vehicle driveline component of claim 8, wherein the first arcuate segment contacts the first side of the associated one of the first mounting teeth at a location along a length of the first side that is within 20% of a midpoint of the length of the first side.

10. The vehicle driveline component of claim 1, wherein the transmission includes a sun gear, a planet carrier and a plurality of planetary gears, the planet carrier having a plurality of pins, each of the planetary gears being journally supported by one of the pins and being meshingly engaged with the sun gear and the ring gear.

11. The vehicle driveline component of claim 10, wherein each of the planetary gears has a first planet gear, which is meshingly engaged to the sun gear, and a second planet gear that is meshed with the ring gear and coupled for rotation with the first planet gear.

12. The vehicle driveline component of claim 10, further comprising a differential assembly and a pair of output shafts, the differential assembly having a differential input member, which is coupled to the planet carrier for rotation therewith, and a differential gearset having a pair of differential output members, the differential gearset receiving rotary power from the differential input member and outputting rotary power to the pair of differential output members, each of the output shafts being coupled for rotation with a corresponding one of the differential output members, wherein one of the output shafts is received coaxially within the sun gear.

13. The vehicle driveline component of claim 12, wherein the differential gearset comprises a plurality of differential pinions and a pair of side gears, wherein the differential pinions are coupled to the differential input member for rotation therewith about the axis but which are each rotatable relative to the differential input member about a respective differential pinion axis, wherein each of the side gears is meshingly engaged with the differential pinions and either is or drives an associated one of the differential output members.

14. The vehicle driveline component of claim 12, further comprising an electric motor having a rotor that transmits rotary power to the sun gear.

15. The vehicle driveline component of claim 14, wherein the one of the output shafts is received coaxially within the rotor.

16. A vehicle driveline component comprising:
a housing defining a ring gear bore, a first groove, and a plurality of second grooves, the ring gear bore being disposed about an axis, the first groove intersecting the ring gear bore, each of the second grooves being disposed circumferentially about and intersecting the ring gear bore;
a transmission received in the housing, the transmission having a ring gear with a ring gear body, a first mounting tooth, and a plurality of second mounting teeth, the ring gear body defining an internally toothed aperture, the ring gear body being received in the ring gear bore, the first mounting tooth projecting radially from and being received into the first groove in the housing, each of the second mounting teeth projecting radially from and being circumferentially spaced about the ring gear body, each of the second mounting teeth being received into a corresponding one of the second grooves in the housing such that a first flank of each of the second mounting teeth abuts a first wall of an associated one of the second grooves and a second flank of each of the second mounting teeth abuts a second wall of the associated one of the second grooves; and
a spring set having a first spring and a second spring, the first spring being disposed between a first side of the first mounting tooth and a first wall of the first groove, the second spring being disposed between a second side of the first mounting tooth and a second wall of the first groove.

17. The vehicle driveline component of claim 16, wherein the first and second springs are fixedly coupled to one another.

18. The vehicle driveline component of claim 16, wherein the transmission includes a sun gear, a planet carrier and a plurality of planetary gears, the planet carrier having a plurality of pins, each of the planetary gears being journally supported by one of the pins and being meshingly engaged with the sun gear and the ring gear.

19. The vehicle driveline component of claim 18, further comprising a differential assembly and a pair of output shafts, the differential assembly having a differential input member, which is coupled to the planet carrier for rotation therewith, and a differential gearset having a pair of differential output members, the differential gearset receiving rotary power from the differential input member and outputting rotary power to the pair of differential output members, each of the output shafts being coupled for rotation with a corresponding one of the differential output members, wherein one of the output shafts is received coaxially within the sun gear.

20. The vehicle driveline component of claim 19, further comprising an electric motor having a rotor that transmits rotary power to the sun gear.

21. The vehicle driveline component of claim 20, wherein the one of the output shafts is received coaxially within the rotor.

22. The vehicle driveline component of claim 19, wherein the differential gearset comprises a plurality of differential pinions and a pair of side gears, wherein the differential pinions are coupled to the differential input member for rotation therewith about the axis but which are each rotatable relative to the differential input member about a respective differential pinion axis, wherein each of the side gears is meshingly engaged with the differential pinions and either is or drives an associated one of the differential output members.

23. The vehicle driveline component of claim 18, wherein each of the planetary gears has a first planet gear, which is meshingly engaged to the sun gear, and a second planet gear that is meshed with the ring gear and coupled for rotation with the first planet gear.

* * * * *